United States Patent Office 2,840,443
Patented June 24, 1958

2,840,443

USE OF METHYLIDYNE BIS PYRAZOLONES FOR DYEING

Carl M. Smith, Easton, Pa., assignor to General Aniline & Film Corporation, New York, N. Y., a corporation of Delaware No Drawing. Application August 5, 1954
Serial No. 448,133

17 Claims. (Cl. 8—55)

This invention relates to a novel process for dyeing animal fibers and synthetic polymeric thermoplastic sheet and fibrous material, and more particularly to the use in such a process of methylidyne bis pyrazolones of the formula

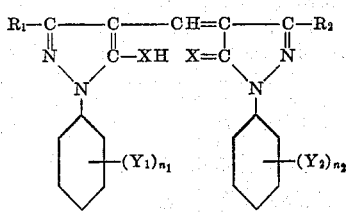

wherein $R_1$ and $R_2$ are selected from the group consisting of lower aliphatic and monocyclic aromatic radicals, X is selected from the group consisting of O and S, $Y_1$ and $Y_2$ are selected from the group consisting of hydrogen, halogeno, lower alkoxy, lower alkyl and sulfonamido and $n_1$ and $n_2$ are integers from 1 to 2.

The methylidyne bis pyrazolones of the above formula are well known in the prior art, and may be made in a variety of manners. Compounds wherein X is oxygen may be prepared by reaction of 2 molecular equivalents of the desired 5-pyrazolone components with 1 molecular equivalent of a methylidyne donor linking agent such as formamide, orthoformic acid or an acyloxydialkoxyformal or of chloroform and alkali. The symmetrical compounds obtained by reacting 2 molecular equivalents of the same 5-pyrazolone with the linking agent are in general preferred. However, by reacting a mixture of two dissimilar 5-pyrazolones with the linking agent, an unsymmetrical product is readily obtained in like manner. Compounds wherein X is sulfur may be prepared by reacting their oxygen analogs with phosphorus pentasulfide. It will be understood that the oxygen analogs may be prepared from the sulfur analogs by reaction with suitable agents under proper conditions.

In the formula given above, $R_1$ and $R_2$ may represent a lower aliphatic radical such as methyl, ethyl, trifluoromethyl, carbomethoxy, carboethoxy, or the like, and/or a monocyclic aromatic radical such as phenyl, chlorophenyl, ethylphenyl, methylphenyl, isopropylphenyl, methoxyphenyl, dimethoxyphenyl, ethoxyphenyl, or the like. $Y_1$ and $Y_2$ may represent in addition to the specifically named substituents, chloro, bromo, methoxy, ethoxy, methyl, ethyl, isopropyl, N-methyl, or -ethyl sulfonamide, N,N-dimethyl- or diethyl sulfonamide, N-morpholino sulfonamide or the like. Among the group of compounds encompassed by the above formula, those particularly preferred are derived from 1-phenyl-3-methyl-5-pyrazolone, 1-phenyl-3-carbomethoxy-5-pyrazolone, and 1,3-diphenyl-5-pyrazolone. Other suitable 5-pyrazolone components which may be employed in producing the methylidyne bis pyrazolones of the instant invention include 1-(x-chlorophenyl)-3-methyl-5-pyrazolone, 1-(x-bromophenyl)-3-methyl-5-pyrazolone, 1-(p-tolyl)-3-methyl-5-pyrazolone, 1-phenyl-3-trifluoromethyl-5-pyrazolone, 1-(m-sulfamylphenyl)-3-methyl-5-pyrazolone, 1-(m-[N,N - dimethyl]sulfamylphenyl)-3-methyl-5-pyrazolone, 1 - (m - [N-morpholino]sulfamylphenyl)-3-methyl-5-pyrazolone, 1 - (x-chlorophenyl)-3-carbomethoxy-5-pyrazolone, 1-phenyl-3-carboethoxy-5-pyrazolone, and the sulfur analogs of these compounds, and the like.

The methylidyne bis pyrazolones above described have hitherto been employed as indicators and as sensitizers in photographic uses where their use depends upon lack of fastness or discharge of the color by light. Even where the colors produced were considered stable from a photographic standpoint, their light fastness was very poor from a dyestuff application standpoint. The compounds dissolve in alkaline aqueous media and hence the products would not be expected to be washfast. These compounds have accordingly never been employed for dyeing textile or synthetic polymeric thermoplastic material. As a matter of fact, the closely related compound rubazonic acid, wherein the methylidyne linkage is replaced by a —N= linkage, produces dyeings on Dacron which are extremely fugitive, fading to a clean white after two hours in the Fadeometer. It was accordingly unforeseeable and highly unexpected to discover that the methylidyne bis pyrazolones above described may be employed for dyeing animal fibers and synthetic polymeric thermoplastic material in sheet or fibrous form to yield yellow dyeings having excellent light- and washfastness. The reason for this surprising behavior is not known, but in any case, the process of this invention enables the production of yellow dyeings of a highly improved and stable character hitherto difficult to attain.

The material which may be dyed in accordance with the process of this invention may have a basis of animal fibers such as wool or silk, or of synthetic polymeric thermoplastic material such as polyacrylonitrile, polyvinyl chloride, polyvinyl acetate, polyvinylidene chloride, polyethylene terephthalate, nylon, cellulose acetate, or mixtures and copolymers thereof. All the aforementioned synthetic polymeric thermoplastic materials are representative of those which are at least as hydrophobic as cellulose acetate and are dyeable in known manner with disperse dyestuffs. As representative of readily available synthetic material which may be dyed in accordance with the process of this invention, there may be mentioned Dacron (polyethylene terephthalate), Orlon and Acrilan (at least 75 percent polyacrylonitrile), Dynel and Vinyon N (acrylonitrile-vinyl chloride copolymer), Vinyon (vinyl acetate-vinylchloride copolymer), Saran (polyvinylidene chloride), nylon, cellulose acetate and the like in bulk, film, fiber or any other form. The fibrous material may be in any of the usual forms as for example in the form of staple fiber or continuous filaments in bulk form or in the form of tow, rope, yarns, slubbings, warps, fabrics, felts and the like and treated as a wound package, running lengths, fibrous stock, bulk, etc.

In carrying out the process of this invention, the methylidyne bis pyrazolones may be employed in proportions of from about 0.02 to 5% by weight of the material being dyed, depending upon the desired depth of shade. The usual methods of dyeing may be made use of. Preferably, the dye is applied as a disperse dyestuff in the form of its dispersion in a liquid media. It will be understood that the term "dispersion" employed herein is used in its broad sense to include suspensions, emulsions or solutions of the instant compounds in liquid organic or inorganic media in concentrations obviously determined by the depth of shade desired, duration and type of treatment (as by exhaustion or otherwise), material being dyed and the like.

Completely acceptable results may be obtained by application from aqueous dispersion with the aid of surface active assistants and dispersing agents, and/or carriers such as benzoic acid, m-cresol, phenol, salicylic acid, ortho- and para-phenylphenol, phenylmethyl carbinol, and the like. Dye powder compositions comprising by weight about 20 to 80 parts of the methylidyne bis pyrazolone and about 80 to 20 parts of a finely divided dispersing agent have been found to be highly suitable for use in such application. As representative of such dispersing agents there may be mentioned formaldehyde-naphthalene sulfonic acid condensates, lignin sulfonic acids, and partially desulfonated derivatives thereof, secondary licorice extracts, and the alkali and alkali-metal salts of these agents and the like. The usual assistants and surfactants may be added to the dye powder and/or to the aqueous dispersion employed for dyeing. For certain materials such as Dacron and the like, application of the aqueous dye composition in the presence of one of the above-mentioned carriers enables the attainment of improved dyeings.

Excellent results may be obtained by applying the methylidyne bis pyrazolone from a solution thereof in an organic solvent, as for example polyhydric alcohols such as ethylene glycol, propylene glycol, 1,4-butanediol, 1,2,4-butanetriol, and especially diethylene glycol and the like, at temperatures of about 170 to 190° C. for a short period of time of the order of about 5 to 20 seconds. The requirements of the latter process with respect to solubility and stability at the temperatures employed, in addition to the production of light- and wash-fast dyeings have been found to be satisfactorily fulfilled by the compounds employed in the process of this invention.

If desired, synthetic polymeric thermoplastic material in any desired form may be dyed by incorporation of the methylidyne bis pyrazolones of this invention, into the compositions from which they are formed, as for example into the spinning solutions, molding compositions and the like. Thus colored acetate rayon or film may be obtained by incorporation of the methylidyne bis pyrazolone into the spinning solution from which the film or fiber is shaped or extruded.

The following examples, in which parts are by weight unless otherwise indicated, are illustrative but not limitative of the instant invention.

EXAMPLE 1

0.025 g. 4,4'-methylidyne bis (1-phenyl-3-methyl-5-pyrazolone) was dissolved in a heated mixture of 2 cc. alcohol and 4 cc. acetone. There was then added 2 cc. Igepon T (sodium N-acyl-N-alkyltaurate in 5% aqueous solution) and about 100 cc. hot water followed by 100 cc. Glauber's salt (10% solution) and 10 cc. acetic acid (1.4% aqueous solution). This dispersion was brought up to 300 cc. volume with water. A 5 g. sample of pre-wet fiber was dyed in the dispersion at the boil for 1 hour, rinsed and dried.

*Dyeing on Dacron.*—Dyestuff exhausted well from the bath and gave greenish-yellow dyeings of excellent wash and light fastness.

*Dyeing on Dynel.*—Dyestuff exhausted well from the bath and gave strong greenish-yellow shades of excellent wash and good light fastness. The fiber may be relustered in 6% NaCl solution for 10 minutes at the boil before drying.

EXAMPLE 2

0.014 g. dyestuff mixture containing 50 parts 4,4'-methylidyne bis (1-phenyl-3-methyl-5-pyrazolone) and 50 parts Tamol NNO (condensation product of formaldehyde and naphthalene sulfonic acid) was mixed with 100 cc. acetic acid (1.4% aqueous solution) and the dispersion brought up to 300 cc. volume with water. A 5 g. sample of acetate rayon fabric was dyed in the dispersion for 1 hour at 190° F., the goods being entered at about 130° F. After rinsing and drying, the dyeings were a bright greenish-yellow of good strength and of excellent wash and light fastness.

EXAMPLE 3

0.05 g. dyestuff mixture as in Example 2 was pasted with 2 cc. Igepon T (5% aqueous solution) in a small beaker, and about 50 cc. warm water were added. 5 g. swatches of acetate rayon and pre-wet Dacron were worked 5–7 minutes at 180° F. in 200 cc. of distilled water containing 4 g. benzoic acid. To this beaker, the dispersion of dyestuff was then added and volume brought up to 300 cc. with distilled water. The dyebath was maintained for 1½ hours at the boil, after which the swatches were rinsed well.

The dyestuff exhausted completely from the bath and the dyeings were a strong bright greenish-yellow of excellent light, crocking, and wash fastness with good sublimation fastness (1 minute at 320° F.). Color strength increased on AATCC Wash Test #3 with the acetate swatch.

EXAMPLE 4

0.05 g. 4,4'-methylidyne bis (1-phenyl-3-methyl-5-pyrazolone) was brought into solution in 10 cc. diethylene glycol by heating to 190–195° C. At 180° C. a 0.05 g. swatch of Dacron was entered, stirred vigorously for 10 seconds in the solution, removed and immediately plunged into cold water. Then the dyed swatch was soaped by hand, rinsed and dried. Dyeing was a bright strong greenish-yellow of excellent wash and light fastness (100 hour Fadeometer test).

EXAMPLE 5

0.05 g. 4,4'-methylidyne bis (1,3-diphenyl-5-pyrazolone) was brought into solution in 10 cc. diethylene glycol by heating to 190–195° C. At 180° C. a 0.5 g. swatch of Dacron was entered, stirred vigorously for 10 seconds in the solution, removed and immediately plunged into cold water. Then the dyed swatch was soaped by hand, rinsed and dried. Dyeing was a bright strong greenish-yellow of excellent wash and light-fastness (100 hour Fadeometer test).

EXAMPLE 6

To a solution of 15 g. of 4,4'-methylidyne bis (1-phenyl-3-methyl-5-pyrazolone) in 250 cc. of chloroform was slowly added with stirring, 13.4 g. of bromine. The mixture was refluxed for two hours. Methanol was added and the mixture refluxed for one hour, then chilled in an ice-bath. The yellow precipitate was recovered by filtration and air dried to form 10.5 g. of yellow dye powder.

The dyeing procedure of Example 3 was repeated, except that the dyestuff employed was the corresponding brominated product prepared as above. With Dacron and acetate rayon, bright greenish-yellow dyeings of good depth and properties resulted. Fastness to light, crocking and washing were excellent. Little or no dye transfer was noted on sublimation testing for 1 minute at 320° F. Color strength improved on AATCC Wash Test #3 with the acetate swatch.

EXAMPLE 7

A mixture of 36 grams of 4,4'-methylidyne bis (1-phenyl-3-methyl-5-pyrazolone), 300 cc. chlorobenzene and 0.5 cc. thionyl chloride was heated to 65–70° with stirring. Over a period of 1¼ hours, a mixture of 28.5 cc. sulfuryl chloride, 0.5 cc. thionyl chloride and 50 cc. chlorobenzene was added dropwise to the mixture. The mixture was then stirred for 1 hour at 70° and added to 1 liter of cold water. Sodium carbonate was added until the mixture was alkaline, the chlorobenzene was removed by steam distillation, and the yellow dyestuff precipitate recovered by filtration.

The dyeing procedure of Example 3 was repeated, except that the dyestuff employed was the corresponding chlorinated product prepared as above. Bright yellowish-green dyeings with good exhaust were obtained. Light, crocking and wash-fastness were excellent. Testing at 320° F. for one minute showed good sublimation fastness. Color strength improved on AATCC Wash Test #3 on the acetate swatch.

This invention has been disclosed with respect to several preferred embodiments, and various modifications and variations thereof will become obvious to the person skilled in the art. It is to be understood that such modifications and variations are to be included within the spirit and purview of this application and the scope of the appended claims.

I claim:

1. A process comprising dyeing synthetic polymeric thermoplastic material with a compound of the formula

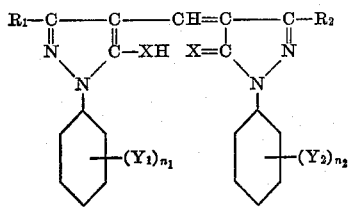

wherein $R_1$ and $R_2$ are selected from the group consisting of lower aliphatic and monocyclic aromatic radicals, X is selected from the group consisting of O and S, $Y_1$ and $Y_2$ are selected from the group consisting of hydrogen, halogeno, lower alkoxy, lower alkyl, and sulfonamido, and $n_1$ and $n_2$ are integers from 1 to 2, dispersed in a liquid medium.

2. A process as defined in claim 1 wherein said compound is dispersed in an aqueous medium.

3. A process as defined in claim 1 wherein said compound is dissolved in an organic solvent medium.

4. A process as defined in claim 1 wherein said compound is dissolved in diethylene glycol.

5. A process as defined in claim 1 wherein said compound is 4,4'-methylidyne bis (1-phenyl-3-methyl-5-pyrazolone).

6. A process as defined in claim 1 wherein said compound is 4,4'-methylidyne bis (1,3-diphenyl-5-pyrazolone).

7. A process as defined in claim 1 wherein said fibrous material has a basis of polyethylene terephthalate.

8. A process as defined in claim 1 wherein said fibrous material has a basis of cellulose acetate.

9. A process as defined in claim 1 wherein said fibrous material has a basis of a copolymer of acrylonitrile and vinyl chloride.

10. A dye powder composition comprising by weight about 20 to 80 parts of a finely divided dispersing agent and 80 to 20 parts of a compound of the formula

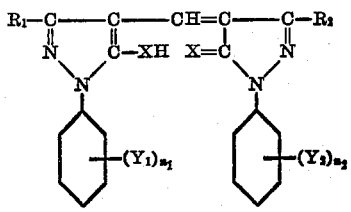

wherein $R_1$ and $R_2$ are selected from the group consisting of lower aliphatic and monocyclic aromatic radicals, X is selected from the group consisting of O and S, $Y_1$ and $Y_2$ are selected from the group consisting of hydrogen, halogeno, lower alkoxy, lower alkyl, and sulfonamido, and $n_1$ and $n_2$ are integers from 1 to 2.

11. A composition as defined in claim 10 wherein said compound is 4,4'-methylidyne bis (1-phenyl-3-methyl-5-pyrazolone).

12. A composition as defined in claim 11 wherein said dispersing agent is the condensation product of formaldehyde and naphthalene sulfonic acid.

13. A composition as defined in claim 12 containing about equal amounts of said agent and said compound.

14. Synthetic polymeric thermoplastic material dyed with a compound of the formula

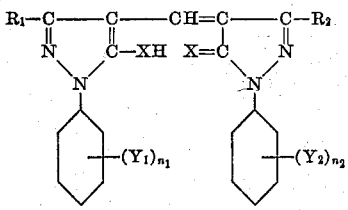

wherein $R_1$ and $R_2$ are selected from the group consisting of lower aliphatic and monocyclic aromatic radicals, X is selected from the group consisting of O and S, $Y_1$ and $Y_2$ are selected from the group consisting of hydrogen, halogeno, lower alkoxy, lower alkyl, and sulfonamido, and $n_1$ and $n_2$ are integers from 1 to 2.

15. A product as defined in claim 14 wherein said fibrous material has a basis of polyethylene terephthalate.

16. A product as defined in claim 14 wherein said fibrous material has a basis of cellulose acetate.

17. A product as defined in claim 14 wherein said fibrous material has a basis of a copolymer of acrylonitrile and vinyl chloride.

References Cited in the file of this patent

UNITED STATES PATENTS

| | | |
|---|---|---|
| 2,028,141 | Ackermann | Jan. 21, 1936 |
| 2,031,356 | Ackermann | Feb. 18, 1936 |
| 2,032,502 | Rod | Mar. 3, 1936 |

OTHER REFERENCES

American Dyestuff Reporter for Nov. 23, 1953, page P792.

American Dyestuff Reporter, Nov. 22, 1954, pp. 774–779 (Article by Rhode Island Section).